United States Patent
Kim et al.

(10) Patent No.: US 7,961,707 B2
(45) Date of Patent: Jun. 14, 2011

(54) METHOD AND APPARATUS FOR MANAGING NEIGHBOR CELLS IN MOBILE COMMUNICATION TERMINAL

(75) Inventors: Yu-Shin Kim, Osan-si (KR); Ranganadh Karella, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1072 days.

(21) Appl. No.: 11/595,081

(22) Filed: Nov. 9, 2006

(65) Prior Publication Data

US 2007/0105586 A1    May 10, 2007

(30) Foreign Application Priority Data

Nov. 9, 2005    (KR) .................. 10-2005-0106780

(51) Int. Cl.
*H04J 3/06* (2006.01)
(52) U.S. Cl. ........ 370/350; 370/324; 370/310; 370/328; 370/331; 455/436; 455/453; 455/525
(58) Field of Classification Search .................. 455/525, 455/436, 453; 370/350, 324, 310, 328, 338, 370/331
See application file for complete search history.

(56) References Cited

U.S. PATENT DOCUMENTS

| | | | | |
|---|---|---|---|---|
| 4,475,010 A | * | 10/1984 | Huensch et al. | 370/334 |
| 5,355,516 A | * | 10/1994 | Herold et al. | 455/510 |
| 5,493,569 A | * | 2/1996 | Buchholz et al. | 370/442 |
| 5,555,266 A | * | 9/1996 | Buchholz et al. | 370/347 |
| 5,862,488 A | * | 1/1999 | Kotzin et al. | 455/510 |
| 5,995,019 A | * | 11/1999 | Chieu et al. | 340/10.32 |
| 6,101,383 A | * | 8/2000 | Poon | 455/425 |
| 6,192,244 B1 | * | 2/2001 | Abbadessa | 455/436 |
| 6,278,883 B1 | * | 8/2001 | Choi | 455/552.1 |
| 6,430,414 B1 | | 8/2002 | Sorokine et al. | |
| 2003/0119550 A1 | * | 6/2003 | Rinne et al. | 455/553 |
| 2003/0148774 A1 | * | 8/2003 | Naghian et al. | 455/456 |
| 2004/0152480 A1 | * | 8/2004 | Willars et al. | 455/513 |
| 2005/0009531 A1 | * | 1/2005 | Lindquist et al. | 455/452.2 |

FOREIGN PATENT DOCUMENTS

| | | |
|---|---|---|
| KR | 1020030031420 | 4/2003 |
| WO | WO 96/31076 | 10/1996 |

* cited by examiner

*Primary Examiner* — Huy Phan
*Assistant Examiner* — Alexander Yi
(74) *Attorney, Agent, or Firm* — The Farrell Law Firm, P.C.

(57) ABSTRACT

A method and apparatus for managing neighbor cells of a mobile communication terminal is provided. In the method, when a neighbor cell list is received from a network, neighbor cells are scanned to select a number of neighbor cells having high received signal strength indicator (RSSI) levels. The selected neighbor cells are managed in a BA list. The BA list is divided into a number of groups according to the RSSI levels. Different minimum signal strengths are applied to the respective groups, and it is determined whether there are neighbor cells that do not satisfy the minimum signal strengths. When the neighbor cells that do not satisfy the minimum signal strengths, the corresponding neighbor cells are deleted from the BA list.

10 Claims, 6 Drawing Sheets

FREQUENCY CORRECTION BURST

| TAIL | 00000000000000000000000000000000000000000000000000000000000000000000000000000000000000000000000000000000000000000000000000000000000000000000 | TAIL | GUARD |
|---|---|---|---|
| 3 | 142 | 3 | 8.25 |

FIG.2A
(PRIOR ART)

SYNCHRONIZATION BURST

| TAIL | CODED DATA | SYNCHRONIZATION SEQUENCE | CODED DATA | TAIL | GUARD |
|---|---|---|---|---|---|
| 3 | 39 | 64 | 39 | 3 | 8.25 |

FIG.2B
(PRIOR ART)

NORMAL BURST

| TAIL | CODED DATA | S | TRAINING SEQUENCE | S | CODED DATA | TAIL | GUARD |
|---|---|---|---|---|---|---|---|
| 3 | 57 | 1 | 26 | 1 | 57 | 3 | 8.25 |

FIG.2C
(PRIOR ART)

| BA LIST | MINIMUM RSSI LEVEL |
|---------|--------------------|
| ARFCN 1 | RXLEV_ACCESS_MIN |
| ARFCN 2 | |
| ARFCN 3 | |
| ARFCN 4 | |
| ARFCN 5 | RXLEV_ACCESS_MIN_BO |
| ARFCN 6 | |

METHOD AND APPARATUS FOR MANAGING NEIGHBOR CELLS IN MOBILE COMMUNICATION TERMINAL

PRIORITY

This application claims priority under 35 U.S.C. §119 to an application filed in the Korean Intellectual Property Office on Nov. 9, 2005 and allocated Serial No. 2005-106780, the contents of which are incorporated herein by reference.

BACKGROUND OF THE INVENTION

1. Field of the Invention

The present invention relates to a mobile communication terminal, and more particularly, to a method and an apparatus for managing neighbor cells in a Global System for Mobile Communications (GSM).

2. Description of the Related Art

2nd Generation (2G) mobile telecommunication systems that provide voice-based services include for example a Global Systems for Mobile Communications (GSM), an Interim Standard (IS)-95. The GSM was commercialized in Europe in 1992 and is based on a Time Division Multiple Access (TDMA).

Referring to FIG. 1, communication between a base station and a mobile terminal in the GSM system includes transmission of a TDMA frame, referred to as a physical channel. The TDMA frame 101 consists of 8 time slots. Data transmitted during one time slot is referred to as a burst. Different logical channels are mapped to the physical channel. The logical channel includes a traffic channel and a control channel. A traffic channel (TCH) multi-frame (MF) 103 consists of 26 TDMA frames 101, and a control channel multi-frame 105 consists of 51 TDMA frames 105. Each of super frames 107 and 109 may consist of 1326(=26×51) TDMA frames 101. The super frames 107 and 109 can be combined to form a hyper frame 111 consisting of 2048 super frames.

The traffic channel is used to transmit voice and data at a data transfer rate of up to 13 Kbps, and the control channel manages a GSM system signaling. Specifically, the control channel is used to carry signaling and synchronization data. The control channels are classified into a broadcast channel (BCH), a common control channel (CCCH), and a dedicated control channel (DCCH).

The BCH is subdivided as follows:

(1) Frequency correction channel (FCCH): This channel is transmitted from the base station to the mobile terminal and used to provide information for frequency correction of the mobile terminal.

(2) Synchronization channel (SCH): This channel is transmitted from the base station to the mobile terminal and used to provide frame synchronization information of the mobile terminal (number of TDMA frames) and base station identification code (BSIC) information for identifying the base station.

(3) Broadcast control channel (BCCH): This channel is transmitted from the base station to the mobile terminal and used to provide information about a selected cell, a neighbor cell and related information for cell selection, and system information.

The types of bursts include a frequency correction burst (FCB), a synchronization burst (SB), and a normal burst (NB). Structures of the FCB, the SB, and the NB will be described below with reference to FIGS. 2A to 2C.

Referring to FIG. 2A, the FCB consists of two 3-bit tail periods, a 142-bit synchronization sequence period each bit of which is zero, and an 8.25-bit guard period. The FCB is used for frequency synchronization of the mobile terminal. The repetition of the FCB defines the FCCH.

Referring to FIG. 2B, the SB consists of two 3-bit tail periods, two 39-bit coded data periods in which the information about the number of frames is encoded, a 64-bit synchronization period, and an 8.25-bit guard period. The FCB is used for time synchronization of the mobile terminal. The repetition of the SB defines the SCH.

Referring to FIG. 2C, the NB consists of two 3-bit tail periods, two 1-bit stealing flags (S), two 57-bit coded data periods, a 26-bit training sequence period, and an 8.25-bit guard period. The NB is used to carry data on the TCH and all control channels other than a random access channel (RACH), the FCCH, and the SCH.

A conventional method for managing a GSM neighbor cell of a mobile communication terminal will be described below. First, a GSM terminal has to maintain synchronization with respect to six neighbor cells transmitted on a BCCH allocation (BA) list. In other words, the mobile terminal is roughly synchronized with the neighbor cells through the FCB, and obtains system information and more accurate synchronization information from the neighbor cells through the SB. Thus, the mobile terminal can exchange actual data with the neighbor cells through the NB. The mobile terminal has to acquire and maintain the synchronization with the corresponding neighbor cells by sequentially detecting and decoding the FCB and the SB transmitted from the neighbor cells.

The mobile terminal decodes the entire BCH data of a serving cell at least every 30 seconds, and decodes the BCCH data block of BCCH carriers of the six neighbor cells at least every 5 minutes. When a new BCCH carrier becomes one of the six neighbor cells, the mobile terminal has to decode the BCCH data within 30 seconds. Upon failure, the mobile terminal discards the BCCH data.

In addition, the mobile terminal synchronizes the FCB and the SB with BCCHs of the six neighbor cells at least every 30 seconds. In this case, even though the mobile terminal fails to acquire the synchronization with the neighbor cells, the mobile terminal acquires the synchronization with the corresponding cells by decoding BCH (FCB/SB) information at least every 30 seconds. However, when the signal electric field such as a received signal strength or Rx quality level is poor, there is a very high probability that the FCB-SB-BCCH data decoding for acquiring synchronization with the neighbor cells will fail. Upon failure of the synchronization acquisition, the mobile terminal continues to try to acquire the synchronization with the neighbor cells until the neighbor cells are discarded from the neighbor cell list (the BA list). In this case, the mobile terminal continues in its attempts to acquire the synchronization with the neighbor cells during an idle mode, causing an increase in power consumption of the mobile terminal.

SUMMARY OF THE INVENTION

An aspect of the present invention is to substantially solve at least the above problems and/or disadvantages and to provide at least the advantages below. Accordingly, an aspect of the present invention is to provide a method and apparatus for managing neighbor cells of a mobile communication terminal.

Another aspect of the present invention is to provide a method and an apparatus for managing neighbor cells of a mobile communication terminal, in which when the mobile communication terminal fails to decode FCB/SB/BCCH of GSM neighbor cells, the neighbor cells are managed while a penalty time for reading a retry period is applied based on the number of failures of the group/mode based synchronization acquisition.

A further aspect of the present invention is to provide a method and apparatus for managing neighbor cells of a mobile communication terminal, in which the mobile communication terminal does not continue to attempt synchronization acquisition when the neighbor cell has poor signal electric field.

According to an aspect of the present invention, a method for managing neighbor cells of a mobile communication terminal includes when a neighbor cell list is received from a network, scanning neighbor cells to select a number of neighbor cells having high received signal strength indicator (RSSI) levels and storing the selected neighbor cells in a BA list; dividing the BA list into a number of groups according to the RSSI levels; applying different minimum signal strengths to the groups, and determining if there are neighbor cells that do not satisfy the minimum signal strengths; and deleting the corresponding neighbor cells that do not satisfy the minimum signal strengths from the BA list.

According to another aspect of the present invention, a mobile communication terminal for managing neighbor cells comprises a controller for selecting neighbor cells having high received signal strength indicator (RSSI) levels, storing the selected neighbor cells in a BA list, dividing the BA list into a number of groups according to the RSSI levels, and deleting from the BA list the neighbor cells that do not satisfy the minimum signal strengths.

BRIEF DESCRIPTION OF THE DRAWINGS

The above and other objects, features and advantages of the present invention will become more apparent from the following detailed description when taken in conjunction with the accompanying drawings in which:

FIGS. 2A through 2C are diagrams of FCB, SB and NB structures;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a method for managing neighbor cells in a mobile communication terminal according to the present invention will be described in detail.

Figure 1:
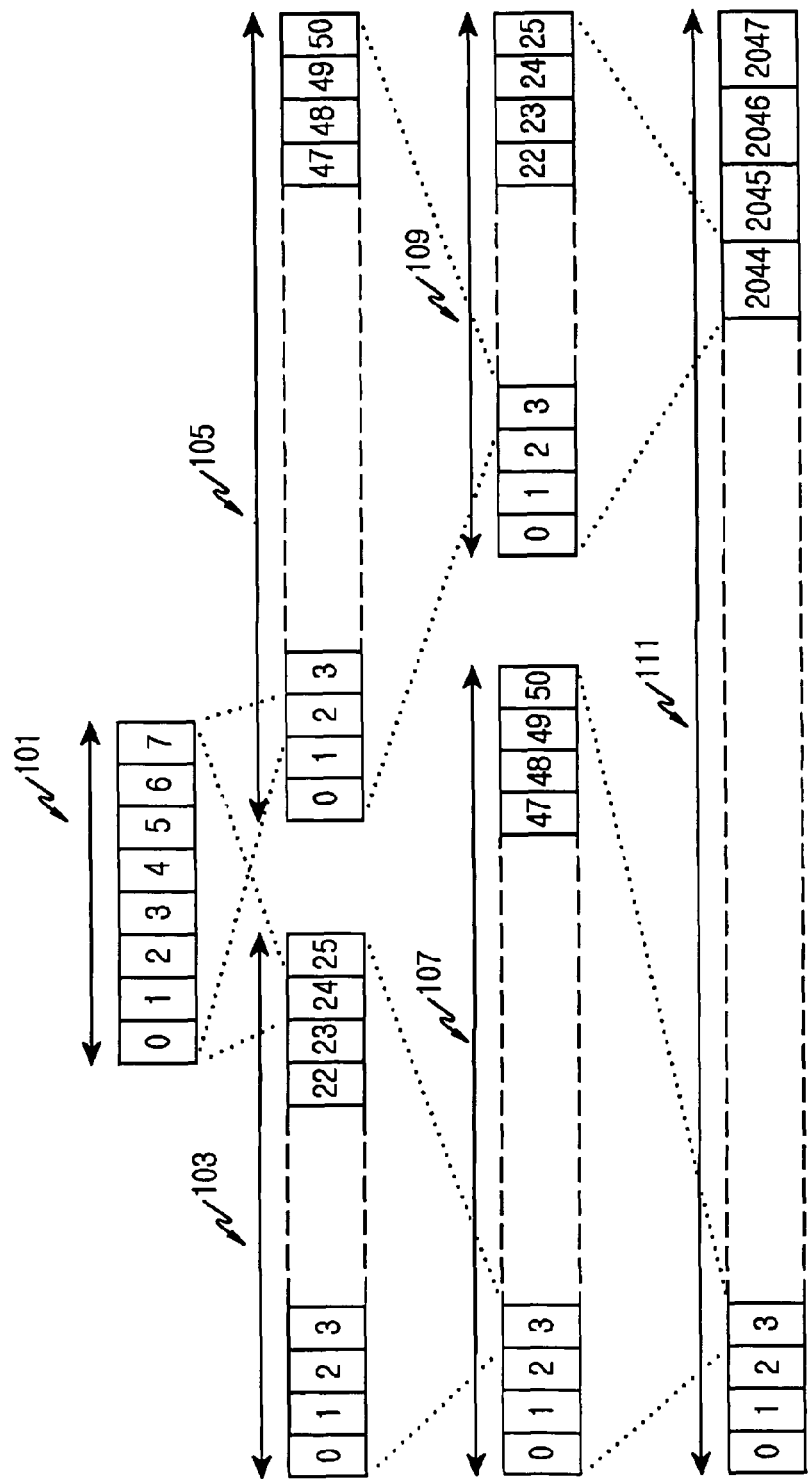
FIG. 1 is a diagram of a physical frame structure in a GSM system.
Figure 3:
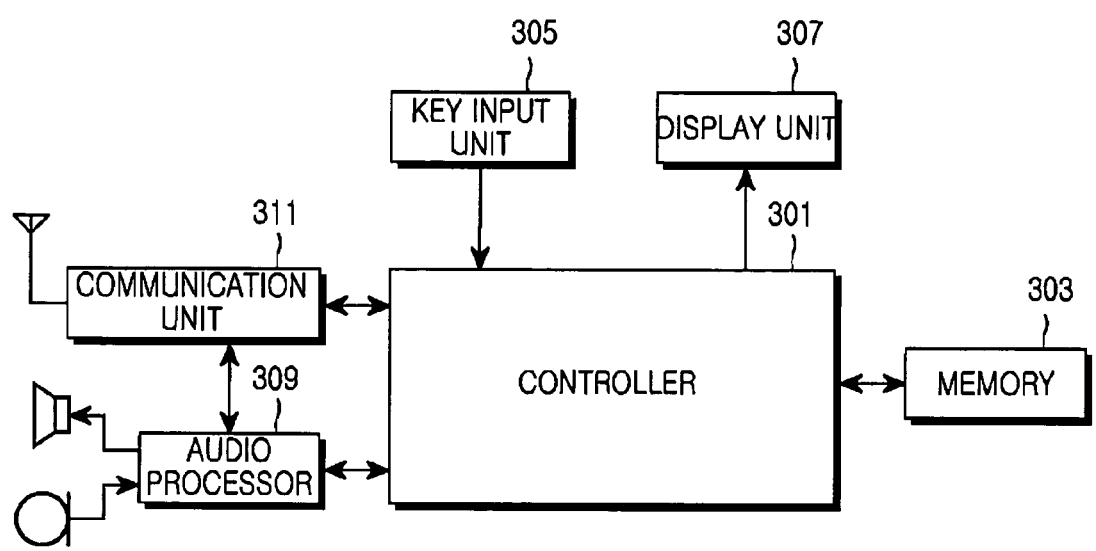
FIG. 3 is a block diagram of a mobile communication terminal according to the present invention.

FIG. 3 is a block diagram of a mobile communication terminal according to the present invention.

Referring to FIG. 3, a controller (e.g., a microprocessor unit (MPU)) 301 controls an overall operation of the mobile communication terminal. For example, the controller 301 controls and processes voice communication and data communication. In addition, the controller controls the function of neighbor cell management. The function includes selecting a number of neighbor cells having high received signal strength indicator (RSSI) levels, and storing the selected neighbor cells in a BA list, dividing the BA list into a number of groups according to the RSSI levels, applying different minimum signal strengths to the groups, and determining if there are neighbor cells that do not satisfy the minimum signal strengths and deleting from the BA list the neighbor cells that do not satisfy the minimum signal strengths. A detailed description about the typical control operations of the controller 301 will be omitted for conciseness.

A memory unit 303 includes a read only memory (ROM), a random access memory (RAM), and a flash ROM. The ROM stores a variety of reference data and microcodes of a program for the processing and controlling operations of the controller 301. The RAM serves as a working memory of the controller 301 to temporarily store data generated during operations. The flash ROM stores a variety of updateable backup data.

A key input unit 305 includes numeric keys of digits 0-9 and a plurality of function keys, such as a Menu key, a Cancel (Delete) key, a Confirmation key, a Talk key, an End key, an Internet connection key, and Navigation keys (or direction keys) to provide key input data that corresponds to a key pressed by a user to the controller 301. A display unit 307 displays status information generated during operations, numerals and characters, moving pictures and still pictures, and so on. The display unit 307 may be a color liquid crystal display (LCD).

An audio processor 309 is connected to the controller 301, and a microphone and a speaker are connected to the audio processor 309. The audio processor 309, the microphone, and the speaker serve as an audio input/output block for conducting telephone conversations and voice recordings. The audio processor 301 converts digital data received from the controller 301 into an analog audio signal to output the analog audio signal to the speaker, and converts audio signal received through the microphone into digital data to provide the digital data to the controller 301.

The communication module 311 processes RF signals transmitted/received through an antenna. For example, during a transmission operation, the communication module 311 channel-codes and spreads a transmit (TX) data to transmit an RF signal. During a reception operation, the communication module 311 despreads and channel-decodes a received RF signal to recover data. Data output from the communication module 311 to the controller 301 may be data received over a traffic channel, or a paging signal and a signaling signal received over a control channel. In addition, the communication module 311 decodes FCB/SB/BCCH data received from a neighbor cell or serving cell.

Figure 4:
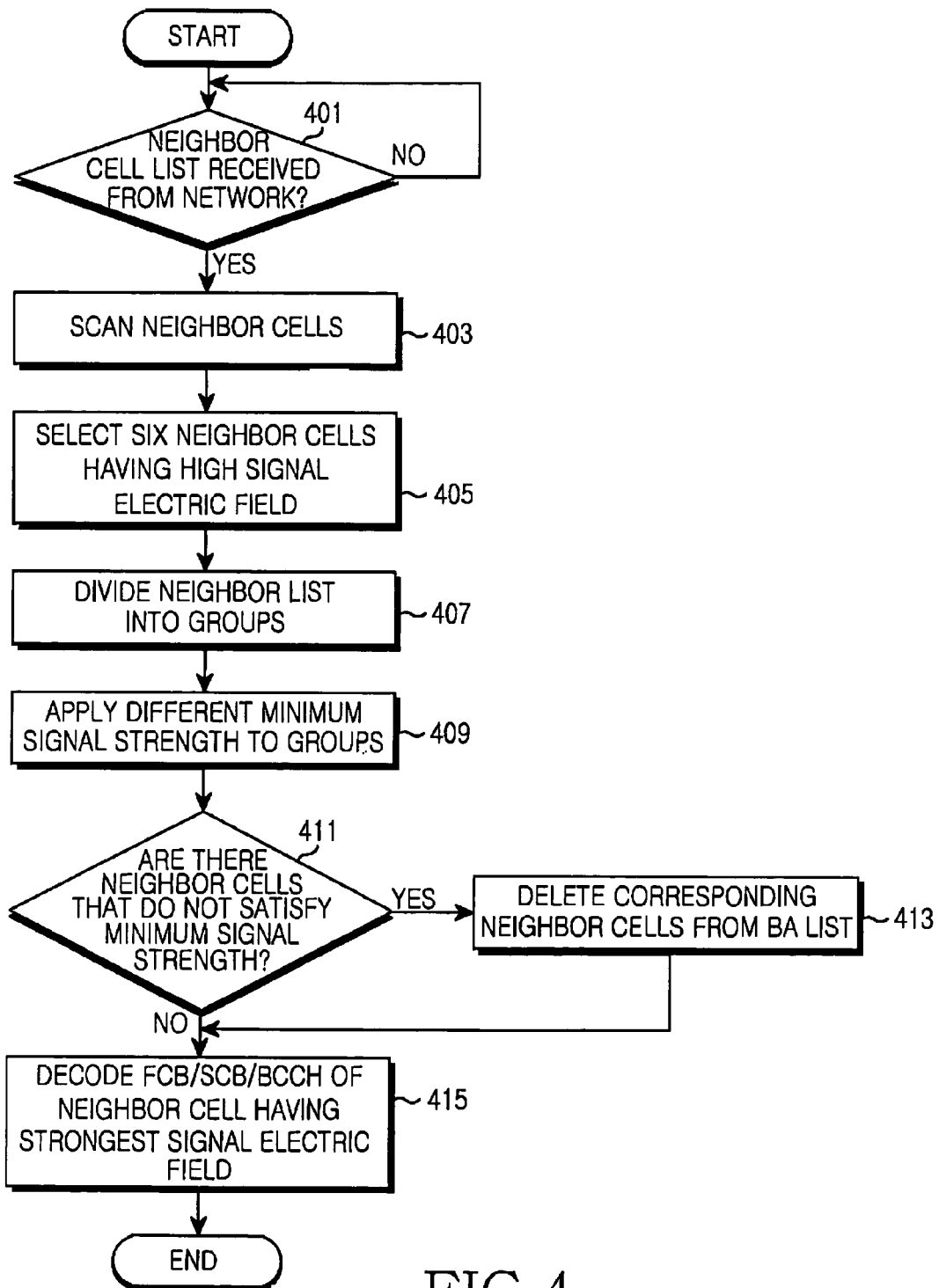
FIG. 4 is a flowchart illustrating a method for determining neighbor cells in the mobile communication terminal according to the present invention.

FIG. 4 is a flowchart illustrating a method for determining neighbor cells in a mobile communication terminal according to the present invention.

Referring to FIG. 4, the controller 301 determines whether a neighbor cell list is received from a network in step 401. System information (SI) 5/SI5bis/SI5ter is transmitted from the network to the mobile communication terminal over BCCH, and the mobile communication terminal can receive information about the neighbor cell list by periodically reading the SI. Alternatively, the mobile communication terminal can receive the information about the neighbor cell list when the terminal is powered on, or can receive the information from the network according to update of the neighbor cells. The information about the neighbor cell list may contain a maximum of 32 base station identity codes (BSIC) and an absolute radio frequency channel number (ARFCN), which is frequency information.

Upon the receipt of the neighbor cell list, the controller 301 scans the neighbor cells to measure received signal strength indicator (RSSI) levels of the neighbor cells in step 403. In step 405, the controller 301 sorts the neighbor cells according to priorities of the RSSI levels, selects six neighbor cells having high RSSI levels from the sorted neighbor cells, and manages the selected six neighbor cells in a neighbor cell list (BA list). The neighbor cells other than the selected six cells are managed in a far cell list.

Figures 6, 7:
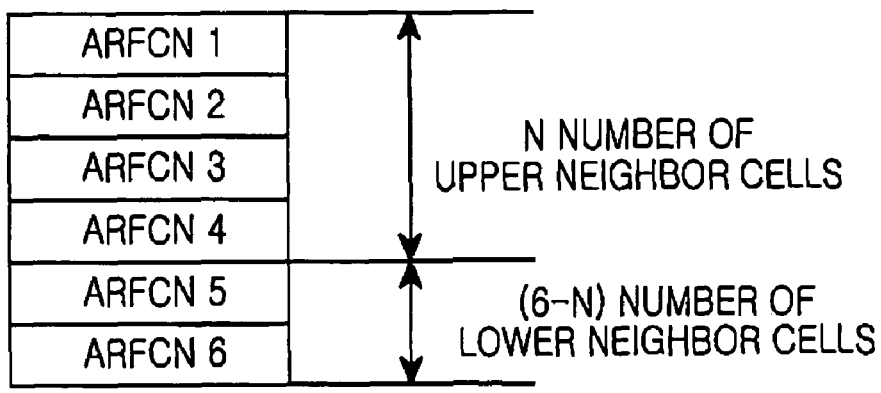
FIG. 6 is a diagram of a BA list divided into a first group consisting of N number of upper neighbor cells and (6–N) number of lower neighbor cells based on the priorities of RSSI levels.
FIG. 7 is a diagram of the BA list and minimum allowable RSSI levels applied thereto.

In step 407, the controller 301 divides the BA list into a number of groups. As illustrated in FIG. 6, the BA list is divided into a first group consisting of N number of upper neighbor cells and (6–N) number of lower neighbor cells according to the priorities of the RSSI levels. Alternatively, the BA list may be divided into L number of upper neighbor cells, M number of middle neighbor cells, and N number of lower neighbor cells. The division of the BA list into a number of groups aims to set a synchronization retry period differently according to the groups when the synchronization trial with respect to the BA list fails.

In step 409, the controller 301 applies different minimum signal strengths to the respective groups. The minimum signal strength is a criterion used to determine a certain cell as the neighbor cell. As illustrated in FIG. 7, the minimum electric fields are not equally applied to all cells of the BA list. The minimum electric fields refers to a minimum allowable RSSI level (RXLEV_ACCESS_MIN). As one example, the value of RXLEV_ACCESS_MIN is applied to the N number of the upper neighbor cells, while the value of RXLEV_ACCESS_MIN_B0 is applied to the (6–N) number of the lower neighbor cells. As another example, the value of RXLEV_ACCESS_MIN is applied to the L number of the upper neighbor cells and the M number of the middle neighbor cells, while the value of RXLEV_ACCESS_MIN_B0 is applied to the N number of the lower neighbor cells. The reason for applying the different minimum signal strengths to the respective groups is that the power consumption of the mobile communication terminal may increase by the repetitive attempts for the synchronization acquisition when the signal electric field is greater than the value of RXLEV_ACCESS_MIN although the signal electric field of the neighbor cell is poor.

The value of RXLEV_ACCESS_MIN_B0 can be defined as Equation (1):

$$\text{RXLEV\_ACCESS\_MIN\_}B0 = \text{RXLEV\_ACCESS\_MIN} + Q \text{ dBm} \quad (1)$$

where Q represents an arbitrary constant.

The value of RXLEV_ACCESS_MIN_B0 may be arbitrarily set by the user, or it may be a value provided through SI 3/4, which is transmitted from the network. By applying the value of RXLEV_ACCESS_MIN_B0 to the (6–N) number of the lower neighbor cells, it is possible to prevent the cells having poor signal strengths from entering the BA list.

In step 411, the controller 301 detects whether there are neighbor cells that do not satisfy the minimum signal strength. When neighbor cells that do not satisfy the minimum signal strength are detected, the controller 310 excludes the corresponding neighbor cells from the BA list in step 413. The excluded neighbor cells are managed in the far cell list. On the other hand, when neighbor cells that do not satisfy the minimum signal strength are not detected, the controller 301 acquires the synchronization from the neighbor cell having the strongest signal electric field in step 415. The synchronization with the neighbor cell may be acquired by decoding the FCB/SB/BCCH information of the neighbor cell. The procedure of acquiring the synchronization with the neighbor cell will be described below in detail with reference to FIG. 5. Finally, the controller 301 terminates the algorithm of the present invention.

Figure 5:
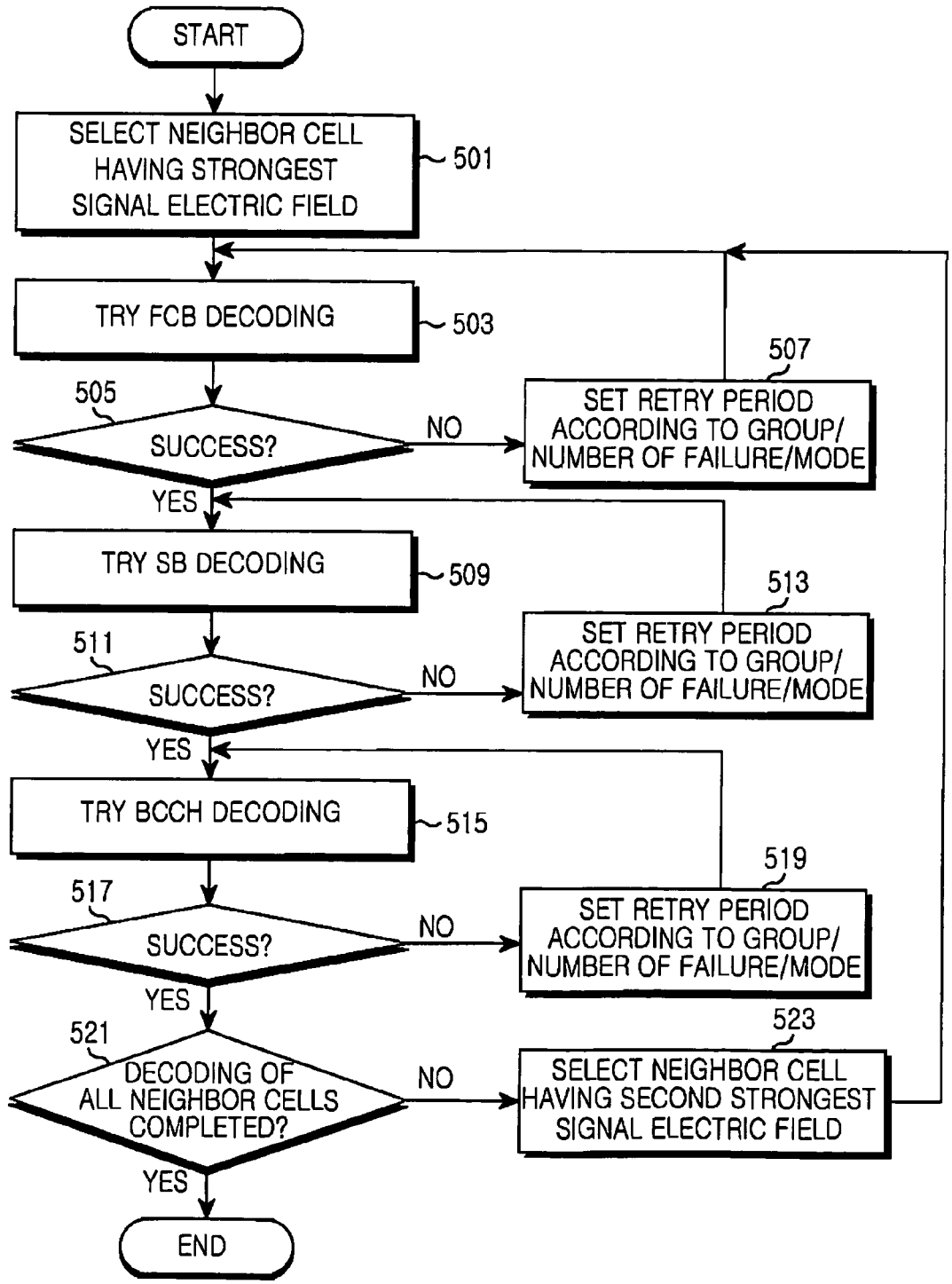
FIG. 5 is a flowchart illustrating a method for acquiring synchronization with a neighbor cell in the mobile communication terminal according to the present invention.

FIG. 5 is a flowchart illustrating a method for acquiring the synchronization with the neighbor cell in the mobile communication terminal according to the present invention.

Referring to FIG. 5, the controller 301 selects the neighbor cell having the strongest signal electric field from the BA list in step 501. The BA list manages a number of neighbor cells that satisfy the minimum signal strength and have high RSSI levels. The neighbor cells may be divided into the N number of the upper neighbor cells and the (6–N) number of the lower neighbor cells according to the priorities of the signal strengths. Also, the neighbor cells may be divided into the L number of the upper neighbor cells, the M number of the middle neighbor cells, and the N number of the lower neighbor cells. In this embodiment, it is assumed that the neighbor cells are divided into the N number of the upper neighbor cells and the (6–N) number of the lower neighbor cells.

In step 503, the controller 301 detects FCB and decodes data carried by the detected FCB so as to acquire the synchronization with the neighbor cell. Using the decoded data, the controller 301 can acquire the synchronization with the neighbor cell. In step 505, the controller 301 determines whether the FCB data decoding is successful. When the FCB data decoding fails, the controller 301 sets a retry period according to the groups/number of the failures/modes in step 507. Then, the process returns to step 503 and the controller 301 retries the FCB data decoding.

When the controller 301 fails to decode FCB/SB with respect to the N number of the upper neighbor cells in the BA list, the retry period according to the number of failures of the neighbor cell acquisition and the modes of the terminal can be set as shown in Table 1 below.

TABLE 1

| | Retry time [sec] | |
|---|---|---|
| No. of Failure | Idle mode | Dedicated mode |
| No fail | Within 30 sec | Within 30 sec |
| 1st fail | 1k | 1k |
| 2nd fail | 2k | 1k |
| 3rd fail | 4k | 1k |
| 4th fail | 5k | 1k |
| 5th fail | 6k | 1k | k represents an arbitrary constant. The value of k may be arbitrarily set by the user, or it may be a value provided through SI 3/4, which is received from the network. In this case, the network can provide the value of k to the mobile communication terminal by adding a variable corresponding to k to a data format of the SI 3/4. The value of k can be set to a value up to 15. When the mobile communication terminal is in dedicated mode, the synchronization with the neighbor cells has to be rapidly acquired. Therefore, the dedicated mode has a retry period shorter than that of the idle mode and has a constant period regardless of the number of failures. In addition, when the mobile communication terminal is in idle mode, the retry period is lengthened as the number of synchronization failures increases. When the number of the synchronization failures exceeds a threshold value, the retry period can be again set to an initial value according to the number of the synchronization failures.

When the controller 301 fails to decode FCB/SB with respect to the (6-N) number of the lower neighbor cells in the BA list, the retry period according to the number of failures of the neighbor cell acquisition and the modes of the terminal can be set as shown in Table 2.

TABLE 2

| | Retry time [sec] | |
|---|---|---|
| No. of Failure | Idle mode | Dedicated mode |
| No fail | Within 30 sec | Within 30 sec |
| 1st fail | 2k | 2k |
| 2nd fail | 4k | 2k |
| 3rd fail | 5k | 2k |
| 4th fail | 8k | 2k | k represents an arbitrary constant. The value of k may be arbitrarily set by the user, or it may be a value provided through SI 3/4, which is received from the network. In this case, the network can provide the value of k to the mobile communication terminal by adding a variable corresponding to k to a data format of the SI 3/4. The value of k can be set to a value up to 15. When the mobile communication terminal is in dedicated mode, the synchronization with the neighbor cells has to be rapidly acquired. Therefore, the dedicated mode has a retry period shorter than that of the idle mode and has a constant period regardless of the number of failures. In addition, when the mobile communication terminal is in idle mode, the retry period is lengthened as the number of synchronization failures increases. When the number of the synchronization failures exceeds a threshold value, the retry period can be again set to an initial value according to the number of the synchronization failures.

As can be seen from Table 1 and Table 2, when synchronization fails, the next synchronization acquisition period of the N number of the upper neighbor cells is made to be shorter than that of the (6-N) number of the lower neighbor cells, thereby acquiring the synchronization in a shorter time.

When the FCB data decoding succeeds and thus the FCB synchronization is acquired in step 505, the controller 301 detects SB, extracts information about the number of encoded frames in the detected SB, and decodes the extracted information in step 509. At this point, the controller 301 can acquire the synchronization with the neighbor cells using the decoded information. In step 511, the controller 301 determines whether the SB data decoding is successful. When the SB data decoding fails, the controller 301 sets a retry period according to the groups/number of the failures/modes in step 513. Then, the process returns to step 509 and the controller 301 retries the SB data decoding. At this point, the retry periods according to the groups/the number of failures/modes can be set as shown in Table 1 and Table 2.

When the SB data decoding succeeds and thus the SB synchronization is acquired in step 511, the controller 301 collects and decodes BCCH data in step 515. In step 517, the controller 301 determines whether the BCCH data decoding is successful succeeds. When the BCCH data decoding fails, the controller 301 sets a retry period according to the groups/number of the failures/modes in step 519. Then, the process returns to step 515 and the controller 301 retries the BCCH data decoding.

The retry periods according to the groups/the number of failures/modes can be set as shown in Table 3 below.

TABLE 3

| | Retry time [sec] | |
|---|---|---|
| No. of Failure | Idle mode | Dedicated mode |
| No fail | Within 30 sec | Within 30 sec |
| 1st fail | 2k | 2k |
| 2nd fail | 3k | 2k |
| 3rd fail | 4k | 2k |
| 4th fail | 5k | 2k | k represents an arbitrary constant. The value of k may be arbitrarily set by the user, or it may be a value provided through SI 3/4, which is received from the network. In this case, the network can provide the value of k to the mobile communication terminal by adding a variable corresponding to k to a data format of the SI 3/4. The value of k can be set to a value up to 15. When the mobile communication terminal is in dedicated mode, the synchronization with the neighbor cells has to be rapidly acquired. Therefore, the dedicated mode has a retry period shorter than that of the idle mode and has a constant period regardless of the number of failures. In addition, when the mobile communication terminal is in idle mode, the retry period is lengthened as the number of synchronization failures increases. When the number of the synchronization failures exceeds a threshold value, the retry period can be again set to an initial value according to the number of the synchronization failures. In the case of the BCCH data decoding, the FCB/SB have been already decoded. Therefore, upon the failure of the BCCH synchronization acquisition, the retry period is set to be shorter than that of the FCB/SB.

When the BCCH data decoding succeeds and thus the BCCH synchronization acquisition succeeds in step 517, the controller 301 determines whether the decoding is performed with respect to all neighbor cells in step 521. That is, the controller 301 determines whether the synchronization acquisition is completed. When the synchronization acquisition with respect to all neighbor cells is not complete, the controller 301 selects a neighbor cell having the second highest signal electric field in step 523. Then, the process returns to step 503 and the controller 31 attempts the FCB synchronization acquisition. When the synchronization acquisition is complete with respect to all neighbor cells, the algorithm of the present invention is terminated.

As another example of the present invention, the method for managing neighbor cells of a mobile communication terminal may comprise selecting neighbor cells having high received signal strength indicator (RSSI) levels, storing the selected neighbor cells in a BA list, dividing the BA list into a number of groups according to the RSSI levels, and deleting from the BA list the neighbor cells that do not satisfy the minimum signal strengths.

As another example of the present invention, the mobile communication terminal for managing neighbor cells may comprise a controller for selecting neighbor cells having high received signal strength indicator (RSSI) levels, storing the selected neighbor cells in a BA list, dividing the BA list into a number of groups according to the RSSI levels, and deleting from the BA list the neighbor cells that do not satisfy the minimum signal strengths.

As described above, the mobile communication terminal according to the present invention does not continue to attempt the synchronization acquisition when the neighbor cell has poor signal electric field. Upon failure of the FCB/SB/BCCH decoding of the neighbor cell, the neighbor cells are managed while a penalty time for reading the retry period is applied according to the number of failures of the group/mode based synchronization acquisition. Consequently, the waiting time in the idle mode can be reduced. Furthermore, the power consumption of the mobile communication terminal can be reduced by up to 20%.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing neighbor cells of a mobile communication terminal, comprising:
    when a neighbor cell list is received from a network, scanning neighbor cells to select a number of neighbor cells having high received signal strength indicator (RSSI) levels, and storing the selected neighbor cells in a Broadcast control channel (BCCH) Allocation (BA) list;
    dividing the BA list into a number of groups according to the RSSI levels;
    applying different minimum signal strengths to the groups, and determining if there are neighbor cells that do not satisfy the minimum signal strengths;
    deleting from the BA list the neighbor cells that do not satisfy the minimum signal strengths; and
    acquiring synchronization from a neighbor cell having a strongest signal electric field, when all the neighbor cells satisfy the minimum signal strength,
    wherein acquiring the synchronization from the neighbor cell having the strongest signal electric field comprises:
        attempting synchronization acquisition of the neighbor cell having the strongest signal electric field;
        determining whether the synchronization acquisition is successful;
        determining a mode of the mobile communication terminal and a number of failures of the synchronization acquisition, when the synchronization acquisition fails;
        setting a retry period of the synchronization acquisition according to the determined mode of the mobile communication terminal and the number of failures of the synchronization acquisition; and
        re-attempting the synchronization acquisition at the set retry period of the synchronization acquisition,
    wherein the neighbor cells deleted from the BA list are stored in a far cell list,
    wherein the groups include a first group consisting of N upper neighbor cells and a second group including M lower neighbor cells based on the RSSI levels, where M = a total number of the selected neighbor cells −N,
    wherein a minimum signal strength applied to the M lower neighbor cells is greater than that applied to the N upper neighbor cells, and
    wherein the minimum signal strength applied to the M lower neighbor cells is a value provided through SI 3/4, which is transmitted from the network.

2. The method of claim 1, wherein acquiring the synchronization from the neighbor cell comprises:
    attempting a frequency correction burst (FCB) synchronization acquisition of the neighbor cell;
    when the FCB synchronization acquisition fails, attempting the FCB synchronization acquisition at retry periods that are set according to a mode of the terminal and number of failures of the FCB synchronization acquisition;
    when the FCB synchronization acquisition succeeds, attempting synchronization burst (SB) synchronization acquisition of the neighbor cell;
    when the SB synchronization acquisition fails, retrying the SB synchronization acquisition at retry periods that are set according to the mode of the terminal and number of failures of the SB synchronization acquisition;
    when the SB synchronization acquisition succeeds, trying broadcast control channel (BCCH) synchronization acquisition; and
    when the BCCH synchronization acquisition fails, attempting the BCCH synchronization acquisition at retry periods that are set according to the mode of the terminal and number of failure of the BCCH synchronization acquisition.

3. The method of claim 2, wherein when the number of the failure of the synchronization acquisition exceeds a threshold value, the retry periods are set to an initial value.

4. The method of claim 2, wherein the mode of the terminal is at least one of an idle mode and a dedicated mode.

5. The method of claim 2, wherein the retry periods are set differently according to the groups.

6. The method of claim 2, wherein the retry period for the BCCH synchronization acquisition is shorter than the retry period for the FCB/SB synchronization acquisition.

7. The method of claim 4, wherein when the mode of the terminal is the idle mode, the retry periods according to the number of the failure of the synchronization acquisition are lengthened.

8. The method of claim 4, wherein when the mode of the terminal is the dedicated mode, the retry periods are identical regardless of the number of the failure of the synchronization acquisition and are shorter than those of the idle mode.

9. The method of claim 5, wherein the retry period for a group consisting of the neighbor cells having high RSSI levels is shorter than the retry period for a group consisting of the neighbor cells having low RSSI levels.

10. A mobile communication terminal for managing neighbor cells, comprising:
    a controller for selecting neighbor cells having high received signal strength indicator (RSSI) levels, storing the selected neighbor cells in a Broadcast control channel (BCCH) Allocation (BA) list, dividing the BA list into a number of groups according to the RSSI levels, applying different minimum signal strengths to the groups, deleting from the BA list the neighbor cells that do not satisfy the minimum signal strengths, and acquiring synchronization from a neighbor cell having a strongest signal electric field, when all the neighbor cells satisfy the minimum signal strength,
    wherein the controller attempts synchronization acquisition of the neighbor cell having the strongest signal electric field, determines whether the synchronization acquisition is successful, determines a mode of the mobile communication terminal and a number of failures of the synchronization acquisition, when the synchronization acquisition fails, sets a retry period of the synchronization acquisition according to the determined mode of the mobile communication terminal and the number of failures of the synchronization acquisition, and re-attempts the synchronization acquisition at the set retry period of the synchronization acquisition, wherein the neighbor cells deleted from the BA list are stored in a far cell list,
wherein the groups comprise:
   a first group including N upper neighbor cells; and
   a second group including M lower neighbor cells,
wherein M = a total number of the selected neighbor cells −N,
wherein a minimum signal strength applied to the M lower neighbor cells is greater than that applied to the N upper neighbor cells, and
wherein the minimum signal strength applied to the M lower neighbor cells is a value provided through SI 3/4, which is transmitted from the network.

* * * * *